United States Patent
Varley et al.

(10) Patent No.: US 9,501,163 B2
(45) Date of Patent: Nov. 22, 2016

(54) APPARATUS AND METHOD FOR ACTIVATING A TRIGGER MECHANISM

(71) Applicant: SYMBOL TECHNOLOGIES, INC., Schaumburg, IL (US)

(72) Inventors: Jordan K Varley, Mississauga (CA); Nader A Newman, Brampton (CA); Bradley M Scott, Mississauga (CA)

(73) Assignee: Symbol Technologies, LLC, Holtsville, NY (US)

( * ) Notice: Subject to any disclaimer, the term of this patent is extended or adjusted under 35 U.S.C. 154(b) by 116 days.

(21) Appl. No.: 14/270,400

(22) Filed: May 6, 2014

(65) Prior Publication Data

US 2015/0324041 A1    Nov. 12, 2015

(51) Int. Cl.
| G06F 3/041 | (2006.01) |
| G06F 3/0488 | (2013.01) |
| G06Q 30/06 | (2012.01) |
| G06K 7/10 | (2006.01) |

(52) U.S. Cl.
CPC ............ *G06F 3/0412* (2013.01); *G06F 3/041* (2013.01); *G06F 3/0488* (2013.01); *G06K 7/1091* (2013.01); *G06K 7/10386* (2013.01); *G06Q 30/0633* (2013.01); *G06F 2203/04104* (2013.01)

(58) Field of Classification Search
CPC .... G06F 3/0412; G06F 3/041; G06F 3/0488; G06F 2203/04404; G06Q 30/0633; G06K 7/10386; G06K 7/1091
See application file for complete search history.

(56) References Cited

U.S. PATENT DOCUMENTS

| 5,536,930 | A | 7/1996 | Barkan et al. |
| 6,501,464 | B1 * | 12/2002 | Cobbley ............... G06F 3/0481 345/173 |
| 8,581,844 | B2 | 11/2013 | Ho et al. |
| 8,704,783 | B2 * | 4/2014 | Davis ................... G06F 3/0488 345/173 |
| 2003/0034392 | A1 | 2/2003 | Grimm et al. |
| 2004/0248621 | A1 | 12/2004 | Schon |
| 2013/0147850 | A1 | 6/2013 | Li et al. |
| 2013/0169540 | A1 | 7/2013 | Dinh |

(Continued)

FOREIGN PATENT DOCUMENTS

| CA | 2673587 A1 | 7/2008 |
| EP | 635780 B1 | 1/2001 |

(Continued)

OTHER PUBLICATIONS

International Search Report and Written Opinion mailed Jul. 13, 2015 in counterpart PCT application PCT/US2015/028406.

*Primary Examiner* — Andrew Sasinowski

(57) ABSTRACT

A method and apparatus for activating a trigger mechanism at a data capture device having a touch display, and a data capture module is provided. In operation, a first region associated with a first application and an input region is provided on the touch display. An input is received at the device, including at least a touch sensor input from the touch display. Based on the input, an obtained input pattern may be identified. The identified input pattern may include at least one of a spatial pattern, a temporal pattern, a touch size and a hard-tap. When the identifying is successful, either an input may be provided to the first application or the trigger mechanism may be activated to initiate a data capture at the data capture module. Alternatively, when the identifying is successful, an operation associated with the first application may be performed or a mode of operation of the data capture device may be changed to a second mode.

18 Claims, 4 Drawing Sheets

(56) References Cited

U.S. PATENT DOCUMENTS

| | | |
|---|---|---|
| 2013/0181050 A1 | 7/2013 | McConnell |
| 2013/0321340 A1* | 12/2013 | Seo ................. G06F 1/1641 345/174 |
| 2013/0339872 A1 | 12/2013 | Shuster et al. |
| 2014/0055400 A1* | 2/2014 | Reuschel ............ G06F 3/041 345/173 |
| 2014/0123069 A1* | 5/2014 | Nishikawa ......... G06F 3/0488 715/835 |

FOREIGN PATENT DOCUMENTS

| | | |
|---|---|---|
| GB | 2502669 A | 4/2013 |
| WO | 2014008670 A1 | 1/2014 |

* cited by examiner

APPARATUS AND METHOD FOR ACTIVATING A TRIGGER MECHANISM

BACKGROUND OF THE INVENTION

Data capture devices such as bar code scanners facilitate information retrieval from objects and locations in a convenient manner. For example, a bar code scanner may be used to read bar codes on prepackaged items at a point of sale. Accordingly, a checkout clerk may identify a product being purchased and its associated price by scanning a bar code and eliminating the need to type the information manually, speeding up the checkout process significantly.

Data capture is typically performed in a routine and rigid manner, repeating data scans in quick succession. For example, at a checkout, a purchased item is scanned within a matter of seconds to capture its identification and price, and this scan process is repeated for each item purchased. Accordingly, being able to quickly identify and activate a trigger mechanism for initiating data capture is important to continue the data gathering process efficiently. This can be done readily when the trigger mechanism is an easily identifiable dedicated physical trigger. However, data capture devices are rapidly being transformed to touch screen devices without physical buttons. With a touch screen device, identifying the virtual trigger mechanism, typically in the form of a virtual button on a touch screen display, may be a time consuming process since it requires deflecting attention away from the items to be scanned and visually inspecting the screen to locate the touch button.

Moreover, data capture devices are also becoming more versatile, and may accommodate performance of different operational modes besides a data capture mode. Accordingly, data capture may occur while the device is in a mode other than a data capture mode. In such cases, locating and activating a trigger mechanism for capturing data on a touch screen device may require several menu operations. Accordingly, there is a need for an improved mechanism for activating a trigger mechanism on a touch device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
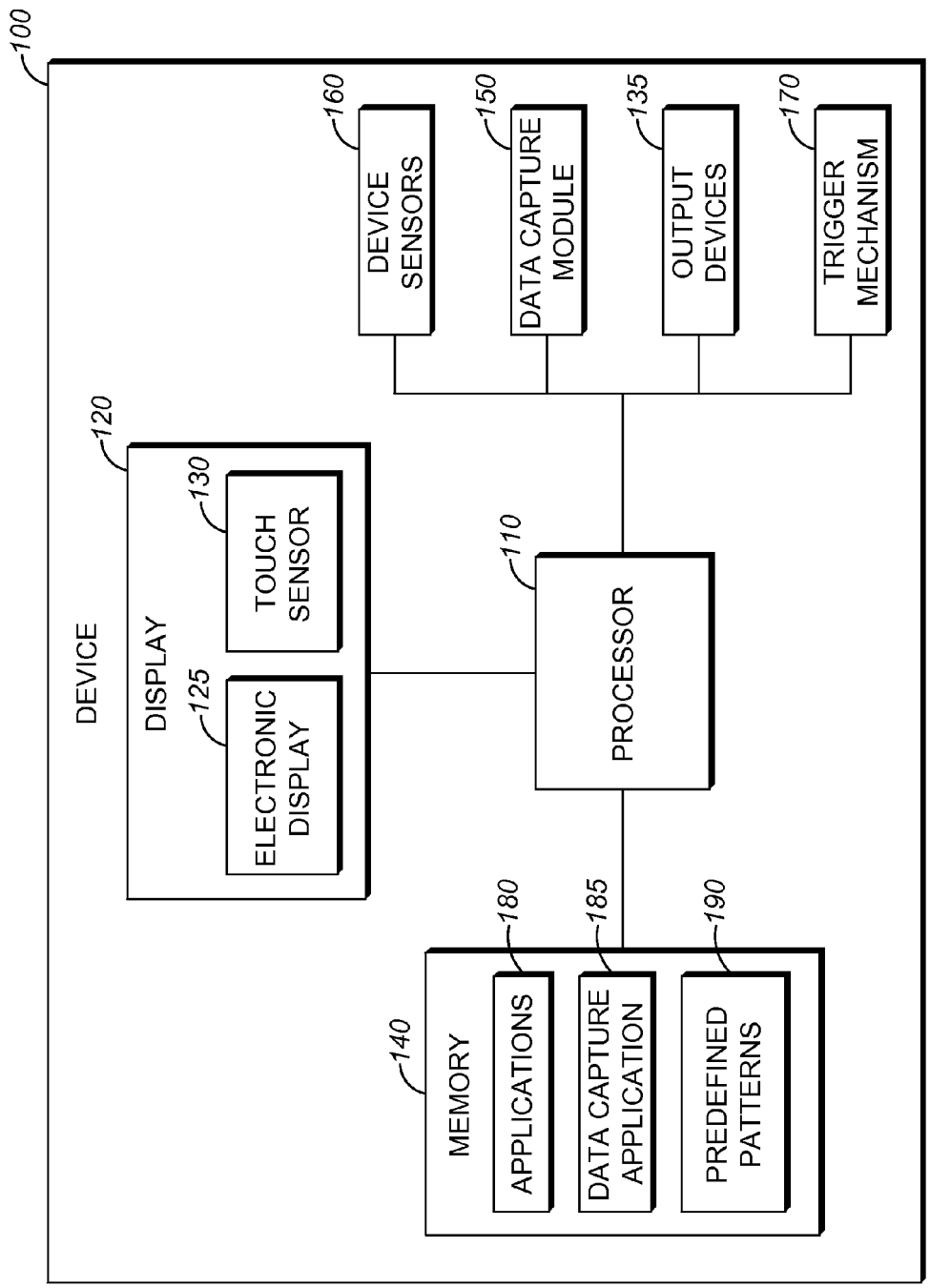
FIG. 1 is a block diagram of a data capture device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method and apparatus for activating a trigger mechanism at a data capture device having a touch display, and a data capture module is provided. In operation, a first region associated with a first application and an input region is provided on the touch display. An input is received at the device, including at least a touch sensor input from the touch display. Based on the input, an obtained input pattern may be identified. The identified input pattern may include at least one of a spatial pattern, a temporal pattern, a touch size and a hard-tap. When the identifying is successful, either an input may be provided to the first application or the trigger mechanism may be activated to initiate a data capture at the data capture module. Alternatively, when the identifying is successful, an operation associated with the first application may be performed or a mode of operation of the data capture device may be changed to a second mode.

FIG. 1 is a block diagram of a data capture device 100 in which methods and components required for performing a variable data capture process is implemented in accordance with the embodiments. The data capture device 100 may take form of, but is not limited to, wearable devices such as finger or head mounted devices, vehicle mounted devices, handheld devices such as a smartphone, a tablet, a bar code scanner, optical code reader and the like, a data capture terminal connected to a handheld device, a desktop, a vehicle mounted device, a laptop or notebook computer, an automated teller machine, a kiosk, a vending machine, a payment machine, facsimile machine, a point of sale device, a vehicle mounted device and the like.

The connection may be wired or wireless. In accordance with some embodiments, it will be appreciated that the connection may utilize a wireless communication system, a wired communication system, a broadcast communication system, or any other equivalent communication system. For example, the communication system may function utilizing any wireless radio frequency channel, for example, a one or two-way messaging channel, a mobile cellular telephone channel, or a mobile radio channel. Similarly, it will be appreciated that the communication system may function utilizing other types of communication channels such as Institute of Electrical and Electronics Engineers (IEEE) 802.11, IEEE 802.16 and/or Bluetooth channels. Further, it will be appreciated that the communication system may function utilizing a wireline communication channel such as a local area network (LAN) or a wide area network (WAN) or a combination of both. The LAN, for example, may employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or chargers. The WAN, for example, may use a physical network media such as X.25, Frame Relay, ISDN, Modem dial-up or other media to connect devices or other local area networks. In the following description, the term "communication system" or "connection" refers to any of the systems mentioned above or an equivalent. Embodiments may be advantageously implemented to perform variable data capture processes on the data capture device 100. Embodiments may be implemented in any electronic device performing data capture.

The data capture device 100 comprises a processor 110, a touch display 120, one or more output devices 135, a memory 140, a data capture module 150, one or more device sensors 160 and a trigger mechanism 170. The processor 110 runs or executes operating instructions or applications that are stored in the memory 140 to perform various functions for the data capture device 100 and to process data. The processor 110 includes one or more microprocessors, microcontrollers, digital signal processors (DSP), state machines, logic circuitry, or any device or devices that process information based on operational or programming instructions stored in the memory 140. In accordance with the embodiments, the processor 110 processes various functions and data associated with carrying out the variable data capture process.

The touch display 120 may be realized as an electronic display 125 configured to graphically display information and/or content under the control of the processor 110. Depending on the implementation of the embodiment, the electronic display 125 may be realized as a liquid crystal display (LCD), a touch-sensitive display, a cathode ray tube (CRT), a light emitting diode (LED) display, an organic light emitting diode (OLED) display, a plasma display, a projection display, or another suitable electronic display. The touch display 120 may provide a user interface between the data capture device 100 and a user.

As shown in FIG. 1, the touch display 120 includes a touch sensor 130. The touch sensor 130 can provide an input interface that can complement an output interface, as provided by the electronic display 125. The touch sensor 130 may have a touch-sensitive surface, sensor, or set of sensors that accepts input from the user based on haptic and/or tactile contact. The touch sensor 130 may be operated on by an input device (such as a finger of a user or other input device such as a stylus, including passive and active) to provide touch sensitive inputs to the data capture device 100. In accordance with some embodiments, the touch display 120 has a virtual keypad or keyboard that comprises a plurality of graphical keys or buttons arranged in a predetermined layout (for example, QWERTY keyboard or numeric/alpha numeric keypads) to allow the user to tap or touch the keys in a sequence to provide inputs to the data capture device 100. Although the block diagram of FIG. 1 shows the touch sensor 130 to be an integral part of the display 120, in one embodiment, the data capture device 100 may include a touch display 120 that is separated from and communicatively coupled to the touch sensor 130. In general, the term "touch sensor" will be used throughout the description to represent any touch sensitive surface or panel that may be used in conjunction with the touch display 120, to receive input. In some embodiments, more than one touch sensor 130 may be provided.

The data capture module 150 includes one or more data sensors for capturing data from various data sources. A data sensor may be an optical sensor such as a charge-coupled device (CCD) sensor, a laser scanner and the like, that may capture data from optical data sources such as bar codes, quick response (QR) codes and video response (VR) codes and other similar optical data sources. Data sensors may also include electromagnetic sensors such as near field communication (NFC) sensors and radio frequency identification (RFID) readers that may capture data from electromagnetic data sources such as from RFID tags and NFC tags, acoustic sensors such as ultrasonic devices, or voice sensors and the like. The data capture module 150 may also include additional components to aid with its operation such as lasers for scanning optical data, optics for directing light to image sensors and antennae for aiding data reception by electromagnetic readers. To capture optical data, the optics of the data capture module 150 may be pointed at the data source, such as a bar code, at an appropriate distance. To capture RFID or NFC data, antennae associated with the RFID reader or NFC sensor are brought within a prescribed range of the item containing the RFID or NFC tag. In accordance with some embodiments, the data capture device 100 may include multiple data capture modules 150, each module including one or more data sensors.

The device sensors 160 may detect various physical forces applied to the data capture device 100. For example, motion sensors such as accelerometers and gyroscopes may detect acceleration and changes in orientation respectively. Other device sensors 160 such as pressure sensors may detect pressure applied to the housing of the data capture device 100. A force sensor may be fabricated using any suitable force sensing technology. Device sensors 160 may include further sensors such as magnetometers, and the like.

The device sensors 160 may be placed on or in a portion of the data capture device 100 in predetermined numbers and arrangements. In one non-limiting example, where the data capture device 100 includes a grip, a pressure sensor may be incorporated as part of the grip, allowing the sensor to detect the amount of pressure (or strength of "squeeze") applied to the grip. In accordance with other embodiments, a plurality of accelerometers may be placed on or in the data capture device 100 so as to enable measuring motion along an associated plurality of axes. In accordance with such an arrangement, motion of the data capture device 100 may be detected. The plurality of accelerometers, for example, may comprise three accelerometers placed along perpendicular axes to provide for three dimensional motion detection of the data capture device 100. Each of the device sensors 160 provides indicators of forces detected to the processor 110, which may process the indicators as appropriate to determine motion and/or pressure.

The trigger mechanism 170 may be a virtual mechanism and/or a physical mechanism, the activation of which enables the performance of various operations and processes by data capture device 100. A physical trigger mechanism may include a physical switch, a capacitive or optical sensor, a pressure sensor, a microphone or other physical mechanisms which may be activated through the provision of an input such as pressure and/or touch applied to the mechanism. A virtual trigger mechanism may be implemented through software applications. For example, the touch display 120 may provide virtual trigger mechanisms such as one or more virtual keys, buttons or regions on the touch display 120 which may be activated by providing an input to the touch sensor 130. In variations, the virtual trigger mechanism may not be displayed and when the trigger mechanism is not displayed, an indication indicating that it is available for activating may be provided. In other mechanisms, the trigger mechanism 170 may be activated through provision of specific audio inputs such as voice commands and the like. The trigger mechanism 170 may be dedicated to triggering one single function or the function triggered through its activation may depend on the operational context of the data capture device 100. In some embodiments, activation of the trigger mechanism 170 may initiate a data capture by the data capture module 150.

The memory 140 may be an IC (integrated circuit) memory chip containing any form of RAM (random-access memory) or ROM (read-only memory), a CD-RW (compact disk with read write), a hard disk drive, a DVD-RW (digital versatile disc with read write), a flash memory card, external subscriber identity module (SIM) card or any other non-transitory medium for storing digital information. The memory 140 comprises one or more applications 180, a data gathering application 185 and one or more patterns 190 corresponding to one or more known gestures. The applications 180 include various software and/or firmware programs necessary for the operation of the data capture device 100 as well as software and/or firmware programs (e.g. banking, email applications etc.) that address specific requirements of the user.

The data gathering application 185 includes instructions that may be executed by the processor 110 to gather data from various data sources through the use of the data capture module 150 in accordance with a data capture process. Data sources may be located in or on items such as inventory, packed individually or in groups, machine parts, and the like and locations such as walls, shelves, items stored in a warehouse, items transported in a truck, and the like. To perform the data gathering process, the data gathering application 185 may provide an indication that it is ready to receive captured data. Once the data capture device 100 is appropriately positioned to capture data from a data source, the trigger mechanism 170 is activated to initiate data capture through the data capture module 150. The captured data is then provided, by the processor 110, to the data gathering application 185. The data gathering application 185 may subsequently cause the processor 110 to process the captured data in accordance with instructions contained by the data gathering application 185. In some embodiments, the captured data may be processed prior to its provision to the data gathering application 185 or may be processed by the data gathering application 185. In further embodiments, the processed data may be provided as an input to an input field of the data gathering application 185 and displayed on the touch display 120 accordingly.

In some embodiments, the virtual trigger mechanism 170 may be provided on the touch display 120 simultaneously with the applications 180 and/or the data gathering application 185. In these embodiments, the region of the touch display 120 associated with providing the virtual trigger mechanism 170 may overlap with the region of the touch display 120 for providing the applications 180 and/or the data gathering application 185. Accordingly, the virtual mechanism 170 and/or the applications 180 and/or the data gathering application 185 may be translucent. Translucency allows the applications 180 or the data gathering application 185 to be visible through the virtual trigger mechanism 170 and vice versa.

In some embodiments, activation of the trigger mechanism 170 may be based on obtaining and identifying an input. The input may be received at a location on the touch display 120 that corresponds to a region where the virtual mechanism 170 is displayed. Alternatively, the input may be received anywhere on the touch display 120. For example, in some embodiments where the virtual trigger mechanism 170 is not displayed at device 120, the input may be received at any area of the touch display 120. In further embodiments, at least a portion of the input may be received at the region of the touch display 120 where the trigger mechanism 170 is provided. In yet further embodiments, the reception of the gesture may originate at a location on the touch display 120 where the trigger mechanism 170 is provided.

To obtain an input, the processor 110 monitors the touch display 120 and the device sensors 160 for at least a predetermined period of time following the initiation of a detection process. In some embodiments, obtaining an input is initiated in response to some received input. In some embodiments, monitoring for an input may be initiated based on the operational state of device 100 in addition to or as an alternative to an input, such as when data capture through data capture module 150 is needed. For example, in some embodiments, data capture may be needed when the data gathering application 185 enters a state of readiness and awaits captured data as an input.

The monitoring may continue until a further input is received indicating that the monitoring should cease, and/or when the operational context of the data capture device 100 changes to one where data capture through the data capture module 150 is no longer required. For example, in some embodiments, the data gathering application 185 may exit a readiness state indicating that it no longer expects captured data as an input. In yet other embodiments, the detection process may always be active, regardless of inputs or the operational state of the data capture device 100.

Based on the monitoring, an input is obtained from the touch sensor 130. In some embodiments, the input comprises a sequence, in time, of touch sensor 130 values corresponding to a gesture sequence representing a gesture pattern. In some embodiments, the input may also include sensor values obtained from the device sensors 160, corresponding to the touch sensor 130 input.

In some embodiments, the obtained input includes input patterns in the form of gesture sequences representing gesture patterns. Gesture patterns may be in the form of device gesture patterns and touch gesture patterns. Device gesture patterns may be obtained when the data capture device 100 obtains a gesture though one or more of the device sensors 160, whereas touch gesture patterns may be obtained when the data capture device 100 obtains a gesture through the touch sensor 130. Accordingly, device gesture patterns may include any gesture patterns obtained through one or more device sensors 160, including accelerometers, gyroscopes, pressure sensors, magnetometers and the like. In some embodiments, device gestures may include shaking, tilting, rotating, and the like. For example, in an embodiment, a side to side translational movement of the data capture device 100 may result in the data capture device 100 obtaining a device gesture pattern represented by a sequence of sensor values received from an accelerometer corresponding to the movement. Alternatively, the data capture device 100 may obtain sensor values corresponding to a side to side or forward and backward tilt. In further embodiments, the data capture device being raised in an arc from a horizontal position to a vertical position with the touch screen facing a user may result in the data capture device 100 obtaining a device gesture pattern represented by a sequence of sensor values obtained from an accelerometer and a gyroscope corresponding to the movement. In other embodiments, the data capture device 100 may obtain a device gesture pattern represented by a sequence of sensor values from a gyroscope corresponding to the data capture device being rotated ninety degrees.

Touch gesture patterns may include any gesture patterns obtained through one or more touch sensors 130. In some embodiments, touch gestures may include, swipe or slide and flick. For example, in some embodiments, the data capture device 100 may obtain a touch gesture pattern from the touch sensor 130 corresponding to a particular pattern of a touch input, for example a swipe from an edge of the touch display 120 towards the middle of the touch display 120.

Gesture patterns may include patterns in space (spatial gestures) and/or time (temporal gestures). Spatial gesture patterns are patterns that are formed from inputs from the touch sensor 130 (touch gesture pattern) or from the device sensors 160 (device gesture pattern), the received gesture patterns, in each case, being based on a spatial pattern. In some embodiments, spatial patterns may be classified in accordance with a type of spatial pattern. For example, in some embodiments, a spatial gesture pattern may be shape based, corresponding to a particular shape, such as a circle, a "z" (for example, as a pattern of points and/or lines), or the like. Shape based patterns may include size, such as, a touch size pattern that includes the size of a touch on the touch display 120. Touch size can be varied by pressing the touch input on the touch display 120 such that greater area of the touch display 120 is covered by the touch input. The size can vary in time by varying the press, or by rolling the input, such as when rolling fingers to provide fingerprints. In other embodiments, a spatial pattern may be location based, corresponding, for example, to a movement related to specific regions of the touch display 120, such as a swipe, with a touch input, from an edge to the center of the touch display 120 and the like. In further embodiments, the gesture pattern may be orientation based, corresponding to a change in orientation, or translation of a capture device 100. For example, the capture device 100 may be raised in an arc form, form a horizontal position to a vertical position. In yet other embodiments, a spatial gesture pattern may comprise discrete movements, corresponding to a series of discrete inputs, such as touches at specific locations of the touch display 120 in a sequence and the like. In further embodiments, a spatial gesture pattern may comprise continuous movements, corresponding to continuous movements, such as a continuous side-to side movement or the like. In variations, gestures may comprise a combination of two or more of the spatial pattern types.

Temporal gesture patterns are gesture patterns that are formed from inputs from the touch sensor 130 (touch gesture patterns) or the device sensors 160 (device gesture patterns), the received gesture patterns in each case being based on patterns in time. For example, the data capture device 100 may obtain a temporal device gesture pattern from the device sensors 160 in accordance with a temporal pattern such that detected movements are separated in time in accordance with a pattern in time. Alternatively, the device 100 may obtain, from one of the device sensors 160 that is a pressure sensor, a temporal gesture pattern corresponding to pressure changes, each pressure variation separated in accordance with a pattern in time. In some embodiments, temporal patterns may be classified in accordance with a type of temporal pattern. For example, in some embodiments, a temporal gesture pattern may be rhythm based, corresponding to a particular rhythm, such as providing touch to the touch display 120 in accordance with a tempo, or shaking the data capture device 100, up or down, in accordance with a rhythm. In further embodiments, a temporal gesture pattern may be speed based, correspond to a speed of movement, such as a flick, with a touch input, on the touch display 120 or a hard tap on the touch display 120. In yet other embodiments, a temporal gesture may comprise discrete movements, corresponding to a series of discrete inputs, such as detected touches at specific locations of the touch display 120 in a timed pattern and the like. In further embodiments, a temporal gesture may comprise continuous movements, corresponding to continuous movements such as a timed pattern of continuous side-to side movement or the like. In variations, gestures may comprise a combination of two or more of the temporal pattern types.

In some embodiments, a gesture pattern obtained can correspond to a combination of spatial and temporal patterns. For example, in one embodiment, a gesture pattern obtained may correspond to a rhythmic back and forth linear movement of an input on the touch display 120. In this case, the linear movement, and its size may represent a spatial pattern and the rhythmic nature of it may represent a temporal pattern.

In some embodiments, sensor values from different device sensors 160 as well as the touch sensor 130 may be included in an input defining more complex gesture patterns. As a non-limiting example, in some embodiments, sensor values from an accelerometer and a gyroscope may be combined to represent a complex gesture pattern including both translational and rotational movements.

In some embodiments, the obtained input may include other input patterns. Moreover, the input patterns may include sensor values from the touch sensor 130 as well as the device sensors 160. As a non-limiting example, in some embodiments, an input pattern "hard-tap" may be represented by both a touch sensor value and a device sensor value. Specifically, a hard-tap input pattern may comprise a touch on the touch display 120, with sufficient force to register a certain amount of acceleration in the direction of the tap. Accordingly, to obtain a hard-tap input pattern, the processor 110 may obtain the touch sensor 130 values representing a touch on the touch display 120. In parallel, the processor 110 may also receive values from one of the device sensors 160 that is an accelerometer representing data capture device 100 movements corresponding to the detected touch. The combination of the touch sensor 130 values and the values of device sensors 160 may accordingly be deemed to represent a hard-tap input pattern when the acceleration values corresponding to the touch, as measured by the accelerometer, is greater than a predetermined acceleration threshold.

In some embodiments, the input pattern may be a touch size input pattern. Accordingly, the input may include an indication of a touch size, in addition to a touch location, both obtained from the touch sensor 130. The combination of the touch location and size indicators may accordingly be deemed to represent a touch size input pattern when the touch size indicators corresponding to the touch, as provided by the touch sensor 130, is greater than a predefined touch-size threshold.

In some embodiments, sensor values comprising the input may be processed. For example, in some embodiments, an obtained sequences of sensor values may be processed to convert them into a pattern that facilitates the identifiability of gesture patterns. As an illustrative example, in some embodiments, a sequence of acceleration values obtained from an accelerometer representing a gesture may be converted into a sequence of relative locations for the data capture device 100, indicating a relative path that the data capture device 100 has traversed in performing the gesture. As a further illustrative example, in some embodiments, a sequence of location values obtained from a touch sensor 130 representing a gesture may be converted into a sequence of relative locations for the display screen, indicating a path that a touch input has traversed relative to the touch display 120, such as a movement from an edge to the center or from the center to the edge of the touch display 120. The processing may occur at the data capture device 100, or may occur at a computing device external to the data capture device 100.

The obtained input pattern, in either raw or processed form, is compared to the predefined patterns 190. The comparison allows determining whether the obtained input pattern can be matched to a predefined one. Predefined patterns may represent any input pattern defined by an operator of the data capture device 100. Predefined patterns may be obtained, for example, using a data capture device 100, by providing an input and storing the corresponding input pattern received on the device. Alternatively, predefined patterns may be obtained from sources external to the data capture device 100 such as other computing devices, servers and the like. In some embodiments, the comparison may be performed at a computing device external to the data capture device 100. In these embodiments, the obtained input pattern may be transmitted to an external computing device for performing the comparison to the predefined gesture patterns. Accordingly, in these embodiments, the predefined gesture patterns may be maintained externally to the data capture device 100.

In some embodiments, when a match between the obtained input pattern and a predefined pattern is identified, on the basis of the comparison, the virtual trigger mechanism 170 can be deemed to be activated. Accordingly, data capture by the data capture module 150 is initiated. In some embodiments, where an input pattern is not obtained (or alternatively, an input pattern is obtained but not identified based on predefined patterns) the input may be provided to the data gathering application 185 or the applications 180. Alternatively, in some embodiments, identification of an obtained input pattern based on a predefined pattern 190 may cause an input to be provided to the data gathering application 185 or the applications 180. In these embodiments, virtual trigger mechanism 170 is activated when the identification of the input pattern fails. In some embodiments, the input provided to the data gathering application 185 or the applications 180 may be indicated as occurring at the location where the obtained input originates. In yet other embodiments, the input provided to the data gathering application 185 or the applications 180 may be a portion of the input. In further embodiments, the input provided to the data gathering application 185 or the applications 180 may be different from the input obtained. For example, the input provided may be a simple indication of a touch at the touch display 120 and the touch may be indicated as occurring at the location where the obtained input originates.

Figure 2:
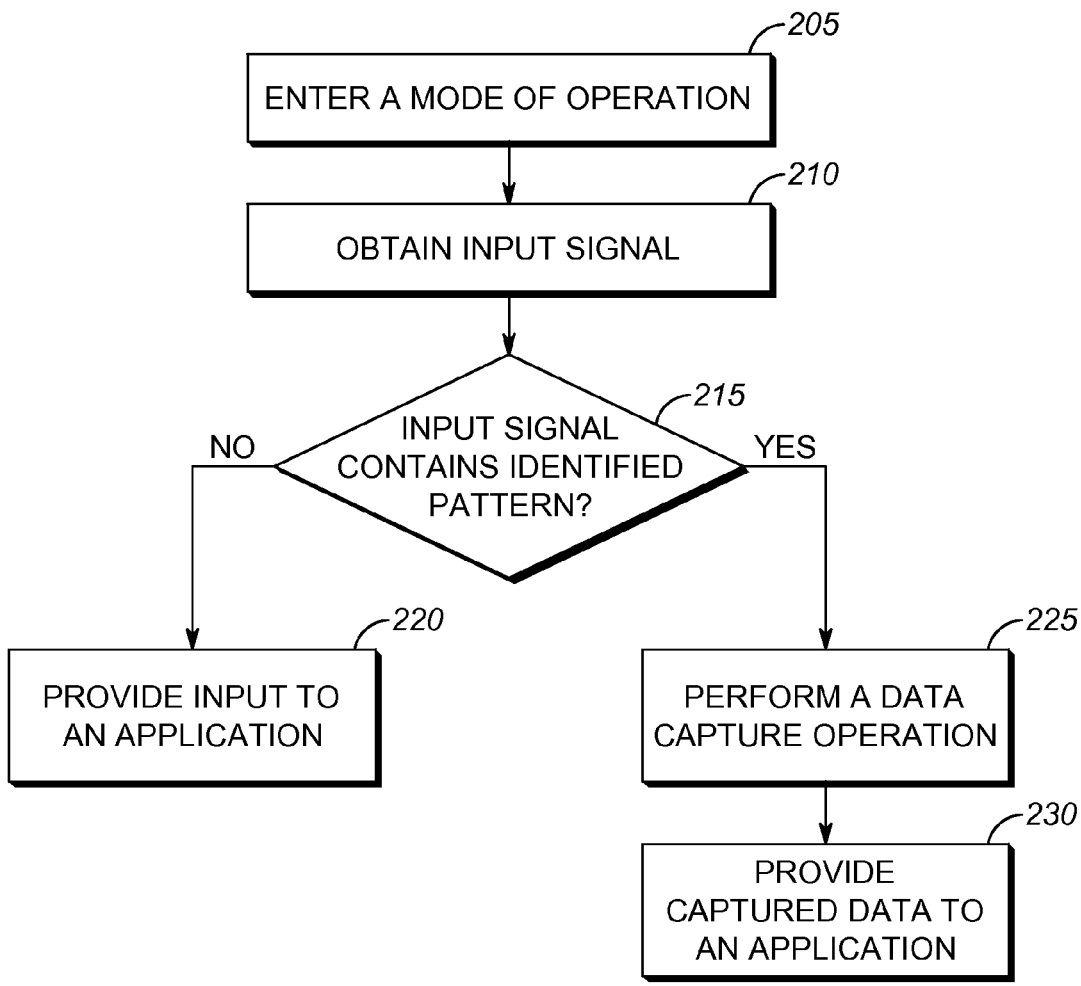
FIG. 2 is a flowchart of a method of activating a trigger mechanism in accordance with some embodiments.

FIG. 2 represents a flowchart of a method 200 for activating a trigger mechanism at the data capture device 100 of FIG. 1 in accordance with some embodiments. As shown in FIG. 2, the method 200 begins by entering a first mode of operation at block 205. In some embodiments, the virtual trigger mechanism 170 is monitored for activation in this mode of operation. In some embodiments, the monitoring occurs in response to the data capture device 100 entering a ready state for capturing data. In other embodiments, the monitoring occurs based on receiving an input, such as a touch. In other embodiments, other types of inputs may be received to initiate the monitoring of the virtual trigger mechanism 170 for activation. In some embodiments, the monitoring may be always on. In other embodiments, the monitoring may last for a predetermined period.

Figure 3:
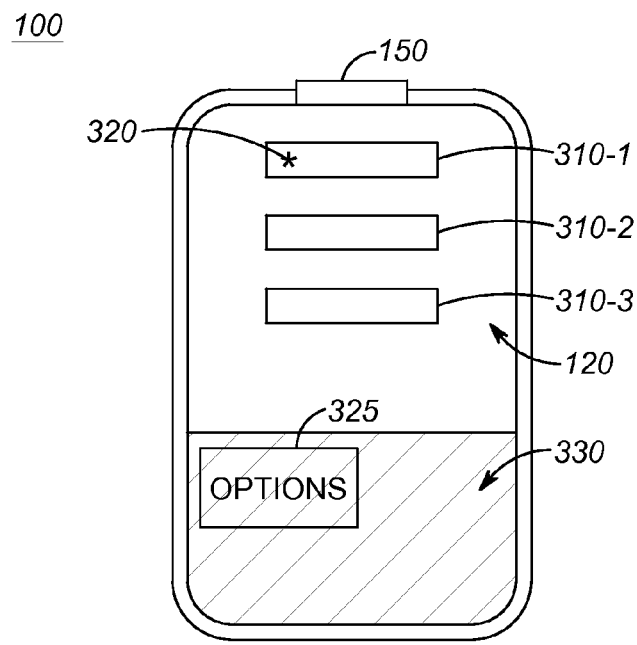
FIG. 3 illustrates a device user interface in accordance with some embodiments.

Referring now to FIG. 3, the touch display 120 of the data capture device 100 is shown in a mode of operation in accordance with one embodiment where the virtual trigger mechanism 170 is being monitored. The touch display 120 includes user interface elements for the data gathering application 185. Although in this non-limiting example, the data gathering application is shown as occupying the whole of the touch display 120, in some embodiments, the display region occupied by the data gathering application 185 may be a portion of the display area of the touch display 120. Input boxes 310-1 through 310-3 are indicated, with the input box 310-1 including an asterisk 320, indicating that the data gathering application 185 is in a ready state to accept captured data to be processed and provided to the input box 310-1. The touch display 120 also includes a virtual button 325, which, when selected allows for the modification of various application options. The touch display 120 further includes a virtual trigger mechanism 170. In this example, the virtual trigger mechanism 170 is shown as an input region 330. As illustrated, the input region 330 overlaps with the display region of the data gathering application 185 and is translucent to allow the user interface of the data gathering application 185 to be visible in areas of the touch display 120 where the user interface of the data gathering application 185 overlaps with the input region 330. Moreover, the change in display characteristics resulting from the translucence serves as an indicator of the presence of the input region 330. In other embodiments, input region may occupy a larger or smaller portion of the touch display 120. In other embodiments, the input region 330 may be invisible, and its presence may be indicated through a visual indicator such as a text, graphic or image indicator, displayed at some portion of the touch display 120.

In some embodiments, the activation of the virtual trigger mechanism 170 may be detected based on obtaining, at the data capture device 100, an input containing an input pattern that can be identified based on matching a predefined pattern. Referring back to FIG. 2, an input is obtained at block 210. Accordingly, the processor 110 monitors one or more device sensors 160 and the touch sensor 130 to obtain the input. An input may comprise spatial or temporal gesture patterns obtained as a result of performing a gesture on the touch display device 120, for example.

Figure 4:
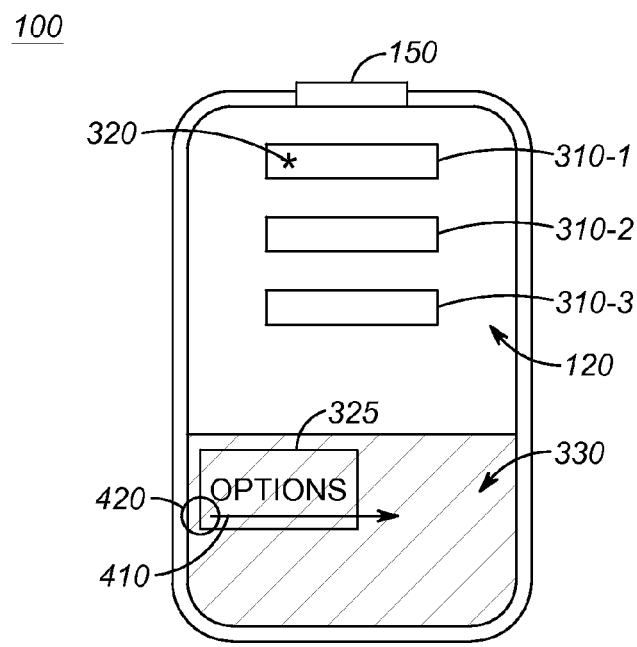
FIG. 4 illustrates a device user interface in accordance with some embodiments.

Referring to FIG. 4, a "swipe-in" gesture is indicated at 410. Accordingly, the data capture device 100 obtains an input pattern based on a horizontal movement of a touch input at the touch display 120 from an edge of the touch display 120, as indicated by the circle 420, towards the middle of the touch display 120, as indicated by the arrow 410. In some embodiments, the swipe-in gesture may be a diagonal or a vertical movement. In other embodiments, the movement may be from an area near the middle of the touch display 120 to an edge of the touch display 120. Obtaining the input is based on the processor 110 receiving a sequence of sensor values from the touch sensor 130 as a result of the gesture. The sequence of sensor values contain information representing the spatial and temporal gesture patterns defining the gesture. In some embodiments, the input may be further processed to better represent the input patterns. In some embodiments, an input pattern obtained by the data capture device 100 may additionally include input data representing rotational movements, discrete movements as well as a sequence of sensor values obtained from the device sensors 160 representing device gestures. Moreover, the movements may also involve temporal patterns, adding a rhythm and the like to the obtained movements and pressure changes, for example. Accordingly, the obtained input pattern may include both spatial and temporal patterns.

As a further non-limiting example, in another embodiment, an input pattern may comprise a touch size pattern and corresponding input obtained may include, sensor values corresponding to the size of the touch input being received at the touch display 120. In another embodiment, an input pattern may comprise a hard-tap. Accordingly, the input received may include sensor values from both the touch sensor 130, indicating a touch and from the device sensors 160 indicating movement corresponding to the touch. In some embodiments, patterns may be combined. For example, the swipe-in gesture may be initiated with a hard-tap pattern.

The obtained input pattern is compared to the predefined patterns 190 to identify the input pattern at block 215. In some embodiments, the data capture device 100 may maintain one or more predefined patterns 190 which are defined to correspond to specific gestures. These predefined patterns may be received by the device 100, prior to performing method 200. In some embodiments, the predefined patterns 190 may be supplied to the data capture device 100 during the operation of method 200.

To identify whether the newly obtained gesture pattern is a predefined one, the obtained input pattern is compared to one or more of the predefined patterns 190. When the comparison results in a match, the obtained input pattern is deemed to be an identified input pattern. Matching an input pattern may be performed using various methods of pattern comparison. In some embodiments, the comparison occurs once the input applied to the data capture device 100 is completed. For example, when a detected input ceases, sensor values received will indicate no further detection. Accordingly, gesture identification may begin. In other embodiments, the identification may be performed on the fly, as the input is being obtained.

When an obtained input pattern cannot be identified, or when an input pattern is not detected in the obtained input, at least a portion of the input is provided to the data gathering application 185 as indicated at 220 in FIG. 2. In some embodiments, an indication may be provided that no input pattern is detected, or that the obtained input pattern cannot be identified. Once an indication is provided, monitoring for an input pattern may be repeated for a predetermined period. After one or more repetitions, at least a portion of the input may be provided to the data gathering application 185 as indicated at 220.

In some embodiments, an input other than the obtained input may be provided to the data gathering application 185 at block 220. For example, the input may be provided as a simple touch input, as opposed to a sequence of input values obtained from the touch sensor 130 or the device sensors 160. The touch input may comprise the location of the touch input on the touch display 120. In some embodiments, the location may be indicated as the originating position of the obtained input on the touch display 120. Alternatively, it may be the ending position of the obtained input on the touch display 120. Accordingly, in an embodiment where identifying the swipe-in gesture indicated at FIG. 4 based on predefined patterns 190 fails, an input may be provided to the data gathering application 185 indicating a touch at location 420 indicated in FIG. 4. Based on the provided input, the virtual button 325 may be activated, allowing modification of application options.

Referring back to FIG. 2, identifying the obtained input pattern successfully causes an activation of the trigger mechanism 170 resulting in a data capture to be initiated at block 225. In some embodiments, the data capture process involves acquiring a representation of data contained at a data source through one or more of the data sensors included in the data capture module 150. For example, an image of a barcode may be acquired.

Figure 5:
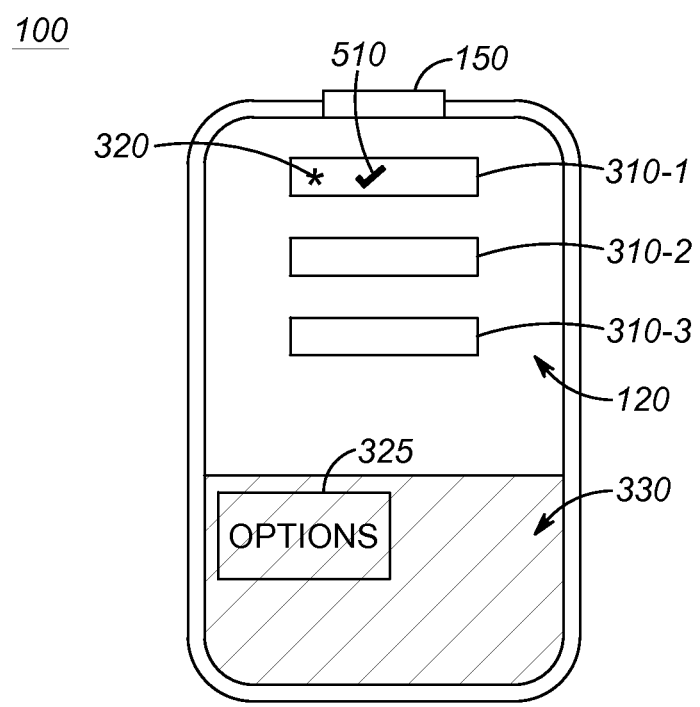
FIG. 5 illustrates a device user interface in accordance with some embodiments.

When the data capture is complete, the captured data may be passed back to the data gathering application 185 at block 230, to be provided, for example, as input for the input box 310-1. In some embodiments, when the data capture is complete, a capture complete indicator may also be generated. In some embodiments, the captured data may be processed, and the processed data may be provided to the input box 310-1. For example, as shown in FIG. 5, the input box 310-1 now includes a checkmark 510, which indicates that the captured data was received and processed successfully. In other embodiments, the indicator 510 may be presented in formats other than graphics, such as in a text or image format. The indicator 510 may include information obtained from the captured data and the information may be obtained from pre or post-processing of the data. In some embodiments, the indicator 510 may also serve as a capture complete indicator. In some embodiments, once input is provided to input box 310-1, the input focus may move to input box 310-2, and the data capture device 100 may once again enter a ready state, causing method 200 to be performed once again.

In further embodiments successful identification of an input pattern at block 215 may cause an operation other than data capture operation to be performed at block 225. For example the data gathering application 185 may be caused to change the active input box, from, for example, input box 310-1 to input box 310-2. Alternatively, when all the input boxes are occupied, they may be caused to be submitted to, for example, one of the applications 180.

In some embodiments, identifying the obtained input pattern successfully at 215 causes the data capture device 100 to enter a different mode of operation. For example, the data capture device 100 may enter a second mode of operation, such as a rapid data capture mode. Once the mode of operation is changed, method 200 may be performed again. In this performance of method 200, when the data capture device 100 is in the rapid data capture mode, the action performed at block 220, based on an unsuccessful identification of an input pattern at block 215 may change. Accordingly, in the second mode of operation, when an obtained input pattern cannot be identified, or when an input pattern is not detected in the obtained input at block 215, a data capture may be performed at 220. Once a data capture is performed, method 200 may be repeated in the second mode of operation. Thus, in the second mode of operation, the data capture device 100 may perform data capture rapidly and repeatedly through, for example, repeated touches on the touch display 120. The captured data can be provided to application 185, for example, as described herein.

In some variations, the second mode of operation can be ended, and another mode of operation, such as the first mode of operation, entered, when for example, an obtained input pattern is successfully identified at block 215. Accordingly, performing block 225, while in the second mode may cause the mode of operation to be changed, for example to the first mode of operation.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of activating a trigger mechanism at a data capture device having a touch display, and a data capture module, the method comprising:
   providing, on the touch display, a first region associated with a first application and an input region;
   receiving, at the data capture device, an input comprising at least a touch sensor input from the touch display;
   identifying, based on the input, an obtained input pattern comprising at least one of a spatial pattern, a temporal pattern, a touch size pattern and a hard-tap pattern, said hard-tap pattern based on a combination of the touch sensor input and a sensor input other than the touch sensor input;
   in a first mode of operation of the data capture device, when the identifying is successful, activating the trigger mechanism to initiate a data capture at the data capture module; and
   in a second mode of operation of the data capture device:
      when the identifying is unsuccessful, activating the trigger mechanism to initiate the data capture at the data capture module, and
      when the identifying is successful, changing the mode of operation of the data capture device from the second mode to the first mode.

2. The method of claim 1 wherein activating the trigger mechanism is performed as a consequence of successfully identifying the obtained input pattern, the method further comprising:
   providing the captured data to the first application.

3. The method of claim 2 wherein the first region further comprises an input area associated with the first application and wherein providing the captured data to the first application further comprises providing the captured data to the input area.

4. The method of claim 2 wherein the first region further comprises a plurality of input areas associated with the first application, the plurality of input areas arranged for receiving input in a predetermined order and wherein the method further comprises providing the captured data to the first application by providing the captured data to a next one of the plurality of input areas to receive input based on the predetermined order.

5. The method of claim 2 further comprising:
   providing at least a portion of the input to the first application when the identifying fails.

6. The method of claim 2 further comprising:
   when the identifying fails, providing an application input to the first application, the application input comprising an input location, the input location being based on a location, at the touch display, of the input other than the originating location of the input.

7. The method of claim 3 further comprising:
processing the captured data prior to providing the captured data to the input area.

8. The method of claim 1 wherein the input originates at the input region.

9. The method of claim 1 wherein at least a portion of the input is received from the input region.

10. The method of claim 1 wherein the identifying further comprises:
maintaining, in a device memory, a predefined pattern;
determining, based on the input, the obtained input pattern; and
matching the obtained input pattern to the predefined pattern.

11. The method of claim 1 wherein the input pattern comprises at least a touch size pattern and the identifying further comprises:
maintaining, in a memory of the device, a predefined touch size;
determining, based on the input, a touch size indicator; and
comparing the touch size indicator to the predefined touch size.

12. The method of claim 1 wherein the device further comprises
an accelerometer and wherein the receiving the input further comprises:
receiving, from the accelerometer, a sensor value;
and wherein the input pattern is the hard-tap pattern and the identifying further comprises:
maintaining, in a memory of the device, a predefined sensor value;
determining, based on the input, the sensor value; and
comparing the sensor value to the predefined sensor value.

13. The method of claim 1 wherein at least one of the first region and the input region is translucent.

14. The method of claim 1 wherein the input region is invisible.

15. The method of claim 14 wherein an indication is provided at the touch display indicating the presence of the input region.

16. A data capture device comprising:
a processor;
a touch display, a data capture module and a trigger mechanism connected to the processor, the processor operating to:
provide, on the touch display, a first region associated with a first application and an input region;
receive, at the data capture device, an input comprising at least a touch sensor input from the touch display;
identify, based on the input, an obtained input pattern comprising at least one of a spatial pattern, a temporal pattern, a touch size pattern, and a hard-tap pattern, said hard-tap pattern based on a combination of the touch sensor input and a sensor input other than the touch sensor input;
in a first mode of operation of the data capture device, when the identifying is successful, activate the trigger mechanism to initiate a data capture at the data capture module; and
in a second mode of operation of the data capture device:
when the identifying is unsuccessful, activate the trigger mechanism to initiate the data capture at the data capture module, and
when the identifying is successful, change the mode of operation of the data capture device from the second mode to the first mode.

17. The device of claim 16 wherein activating the trigger mechanism is performed as a consequence of successfully identifying the obtained input pattern and the processor further operates to:
provide the captured data to the first application.

18. The device of claim 16 wherein the input originates at the input region.

* * * * *